(12) United States Patent
Herrmann et al.

(10) Patent No.: US 6,448,385 B2
(45) Date of Patent: Sep. 10, 2002

(54) CONTINUOUS PROCESS FOR PREPARING METAL COMPLEX PIGMENTS

(75) Inventors: Udo Herrmann, Dormagen; Lothar Weismantel; Frank Linke, both of Köln; Ronald Göbel; Bernhard Krumbach, both of Leverkusen; Wolfgang Frank, Köln, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/821,888

(22) Filed: Mar. 30, 2001

(30) Foreign Application Priority Data

Apr. 3, 2000 (DE) .......................... 100 16 547

(51) Int. Cl.[7] .................. C09B 45/14; C09B 45/22; C09B 67/20; D06P 1/10; D06P 5/06

(52) U.S. Cl. .................. 534/707; 8/466; 8/685; 106/496; 524/100

(58) Field of Search .................. 534/707; 8/466, 8/685; 106/496; 524/100

(56) References Cited

U.S. PATENT DOCUMENTS

| | | | | |
|---|---|---|---|---|
| 3,869,439 A | * | 3/1975 | Schundehutte | 534/707 |
| 4,622,391 A | * | 11/1986 | Lorenz et al. | 534/707 |
| 4,628,082 A | * | 12/1986 | Lorenz et al. | 534/707 |
| 6,211,346 B1 | * | 4/2001 | Linke et al. | 534/707 |
| 2001/0047087 A1 | * | 11/2001 | Herrmann et al. | 534/707 |

FOREIGN PATENT DOCUMENTS

CA 2285829 4/2000

OTHER PUBLICATIONS

Bayer Farben Recue, Sonderheft 3/2D, (Month unavailable) 1986, pp. 12–14, Messzahlen zur beschriebung von Farben und Fabunterschieden.

* cited by examiner

*Primary Examiner*—Fiona T. Powers
(74) *Attorney, Agent, or Firm*—Joseph C. Gil; Richard E. L. Henderson

(57) ABSTRACT

The invention relates to a process for preparing metal complexes of polyvalent metal ions with azo compounds of formula (I)

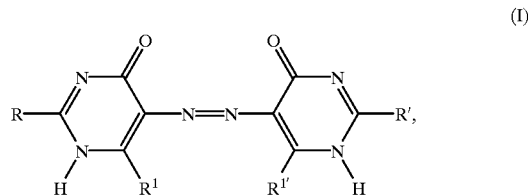

(I)

or tautomeric structures, in which R and R' are —OH, —NH$_2$, —NH—CN, aryl-amino, acylamino, or p-chlorophenyl, and R$^1$ and R$^{1'}$ are independently —OH or —NH$_2$, that intercalate an intercalate by (1) stirring an aqueous dispersion of an alkali metal salt of the azo compound with the polyvalent metal salt at 10 to 35° C.,
(2) admixing an aqueous solution, dispersion, or emulsion of the intercalate,
(3) passing the mixture through a reaction zone at 85 to 140° C., while regulating the pH so that the product dispersion leaving the reaction zone has a pH of 0.5 to 3,
(4) adjusting the pH of the mixture to at least pH 5, and
(5) isolating the intercalated metal complex.

13 Claims, 1 Drawing Sheet

CONTINUOUS PROCESS FOR PREPARING METAL COMPLEX PIGMENTS

BACKGROUND OF THE INVENTION

This invention relates to a novel continuous process for preparing metal complex pigments, especially metal complex intercalates of azobarbituric acid and its derivatives.

Unpublished German patent application 19,924,763.3 describes metal complexes of substituted azo compounds and a batch process for their preparation. In the process, azo compounds of the formula (A)

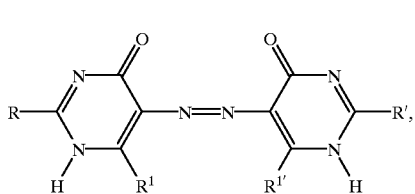

(A)

wherein

R and R' are independently OH, $NH_2$, NH—CN, acylamino, or arylamino and $R^1$ and $R^{1'}$ are independently —OH or —$NH_2$, are complexed with a metal salt of metals selected from the group consisting of Ba, Ca, Zn, Cu, Fe, Co, Sr, Cr, Sn, Al, Mg, Cd, Pb, and La and the resultant metal complex is reacted with a compound to be intercalated (i.e., the intercalate).

Inclusion compounds, intercalation compounds, and solid solutions of metal complexes are known from the literature. Such compounds and their preparation are described for example in EP 74,515 A1.

To prepare the aforementioned pigments in a batch process, first an alkali metal salt of azobarbituric acid or derivatives thereof (formula (I)) are dispersed in water and subsequently admixed with the corresponding amount of a polyvalent metal salt and a corresponding amount of the intercalate. The mixture must then be stirred at 95° C. for several hours. The reacted mixture is finally adjusted to a pH of about 5 and the ready-prepared product is isolated.

The particular disadvantage of the aforementioned batch process is that, particularly at large vessel volumes, the mixture cannot be heated in the desired uniformity. A consequence of such temperature gradients is that mutually competing laking and intercalation reactions take place. A further disadvantage of the batch process is the appearance of an unwanted fraction of particularly finely divided products (i.e., having an average particle diameter of less than 50 nm). In pigment finishing, these products absorb a large portion of the dispersant used for the finishing and then make very little contribution to the color strength desired for the product.

The dispersion harshness of the product is usually more than 300, so that the product from a batch process must be subjected to a subsequent additional heat treatment for applications in which rapid development of color strength is needed.

A further disadvantage is that product quality fluctuates from batch to batch with regard to color, particle size, and harshness of the products. This fluctuating product quality is due to the lack of a control means in the batch process.

It is an object of the present invention to provide a process that avoids the aforementioned disadvantages of the batch process and provides consistent, fluctuationless production of the metal complex intercalates mentioned above. The process is to be continuous, with the laking of the azobarbituric acid compound with polyvalent ions taking place in a first step and the intercalation in the second step.

SUMMARY OF THE INVENTION

The invention accordingly relates to a continuous process for preparing metal complexes of polyvalent metal ions with mono-, di-, tri-, or tetraanions of an azo compound conforming to the formula (I)

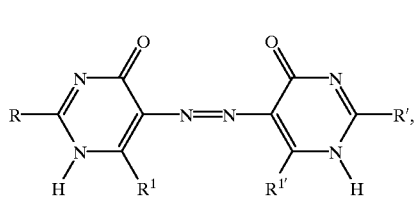

(I)

or one of its tautomeric structures, wherein

R and R' are independently —OH, —$NH_2$, —NH—CN, arylamino, acylamino, or p-chlorophenyl, and $R^1$ and $R^{1'}$ are independently —OH or —$NH_2$, that intercalate at least one intercalate that is a compound different from the compounds of formula (I), wherein the metals of the polyvalent metal ions are selected from the group consisting of Ca, Zn, Cu, Fe, Mn, Ni, Co, Sr, Ba, Cr, Sn, Al, Mg, Cd, Pb, and La, comprising (1) stirring an aqueous dispersion of an alkali metal salt of compounds of formula (I) with the metal salt of the polyvalent metal at a temperature of 10 to 35° C. (especially 20 to 25° C.), especially for a period of 1 to 25 min (preferably 5 to 20 min), if appropriate at a pH of 0.5 to 5.5, (2) admixing an aqueous solution, dispersion, or emulsion of the intercalate, if appropriate with comminution of solid particles (agglomerates) of the mixture before and/or after the admixing of the intercalate, (3) passing the mixture through a reaction zone (such as represented by 18 in FIG. 1) at a temperature of 85 to 140° C. (preferably 110 to 120° C.) under pressure (preferably $10^5$ to $4 \times 10^5$ Pa), especially for a residence time of 1 to 15 min (preferably of 2 to 10 min) in the reaction zone, while regulating the pH of the mixture entering the reaction zone so that the product dispersion leaving the reaction zone has a pH of 0.5 to 3, (4) adjusting the pH of the mixture to at least pH 5, and (5) isolating the intercalated metal complex.

DETAILED DESCRIPTION OF THE INVENTION

Figure 1:
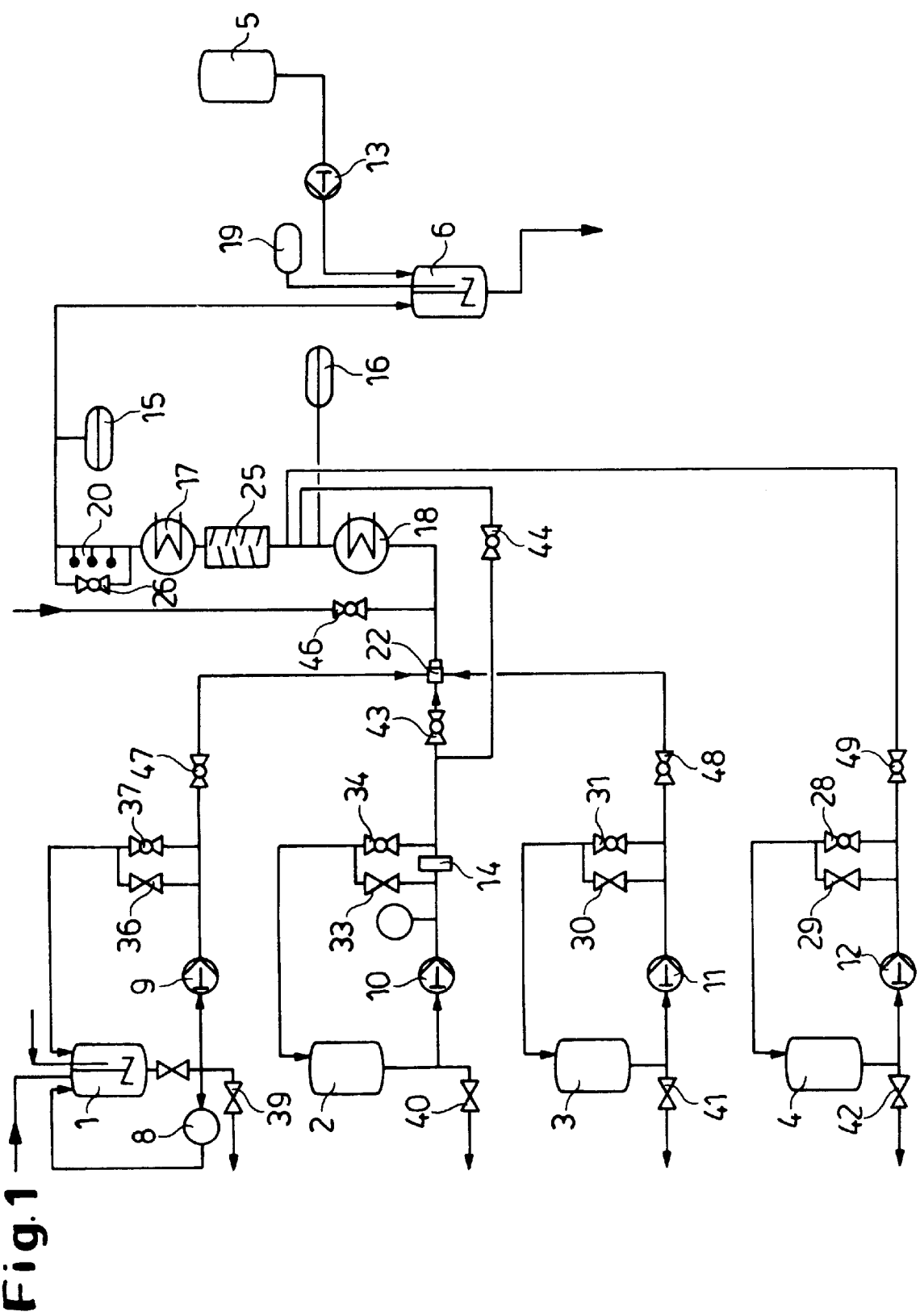
FIG. 1 illustrates a processing scheme for the invention.

Preferably the solid particles of the mixture are comminuted in a pumped circulation circuit, preferably by passing the mixture through a cavitron (8).

The pH in the reaction zone (18) is particularly preferably set by adding strong and weak bases, for example, buffer compounds such as sodium acetate.

Aryl substituents in the formula (I) are preferably phenyl or naphthyl, which may each be substituted by halogen such as F, Cl, or Br or by —OH, $C_1$-$C_6$-alkyl, $C_1$-$C_6$-alkoxy, —$NH_2$, —$NO_2$, or —CN.

Acyl substituents in the formula (I) are preferably selected from the group consisting of ($C_1$-$C_6$-alkyl)carbonyl, phenylcarbonyl, $C_1$-$C_6$-alkyl-sulfonyl, phenylsulfonyl, optionally $C_1$-$C_6$-alkyl-, phenyl-, or naphthyl-substituted carbamoyl, optionally $C_1$-$C_6$-alkyl-, phenyl-, or naphthyl-substituted sulfamoyl, or optionally $C_1$-$C_6$-alkyl-, phenyl-, or naphthyl-substituted guanyl, where the alkyl radicals may additionally be substituted by halogen such as Cl, Br, F, —OH, —CN, —$NH_2$, or $C_1$-$C_6$-alkoxy and the phenyl and naphthyl radicals may additionally be substituted by halogen such as F, Cl, or Br, —OH, $C_1$-C6-alkyl, $C_1$-$C_6$-alkoxy, —$NH_2$, —$NO_2$, and —CN.

Metal complexes for the purposes of this application also include metal salts of azobarbituric acid (derivatives) with divalent metal ions.

Very particularly convenient metal complexes for the process are metal complexes of azo compounds of the formula (I) which in the form of their free acid conform to the formula (II)

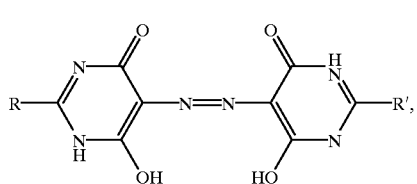

(II)

or one of its tautomeric structures,
wherein R and R' are independently OH and NHCN,
that intercalate at least one other compound (known as the intercalate).

Preference is given in particular to organic metal complexes of azo compounds of the formula (II) which in the form of their free acid conform to one of the tautomeric structures of the formulas (IIa) to (IIc)

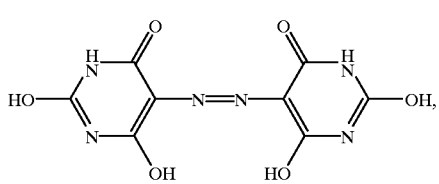

(IIa)

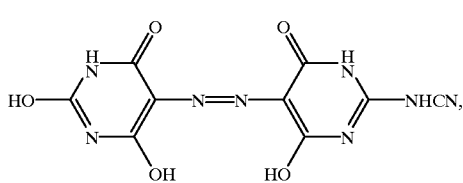

(IIb)

or

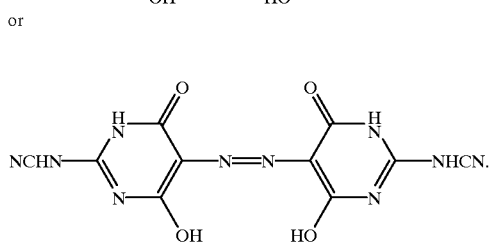

(IIc)

The process of the invention is particularly preferably used to prepare 1:1 azo metal complexes that conform to the formula (Ia)

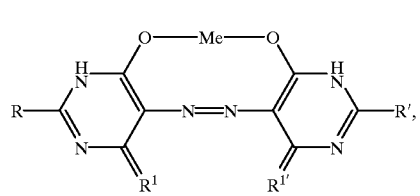

(Ia)

or one of its tautomeric forms,
wherein
Me corresponds to one of the metal ions mentioned for formula (I) (especially Ni, Mn, Cd, or Sn),
R and R' are each as defined for the formula (I), and
$R^1$ and $R^{1'}$ are independently =O or =NH.

Generally the metal complex compound obtainable from the process according to the invention forms a layered crystal lattice in which the bonding between intercalate and metal complex within any one layer is substantially via hydrogen bonds and/or metal ions. Preferably the metal complex compounds are metal compounds that form a crystal lattice which consists of substantially planar layers.

Useful metal complexes also include metal complexes in which a metal-containing compound (for example, a salt or metal complex) is incorporated into the crystal lattice of the metal complex. In this case, in the formula (I), a portion of the metal may be replaced by other metal ions, or further metal ions can enter into a more or less pronounced interaction with the metal complex.

Included compounds may be organic solid or liquid compounds and inorganic solid or liquid compounds. Compounds that can be included come from a very wide variety of classes of compounds. For purely practical reasons, preference is given to compounds that are liquid or solid under normal conditions (i.e., 25° C., 1 bar).

Of the liquid substances, preference is given in turn to those that have a boiling point of 100° C. or higher, preferably of 150° C. and higher. Suitable compounds are preferably acyclic and cyclic organic compounds, for example, aliphatic and aromatic hydrocarbons, which may be substituted, for example by OH, COOH, $NH_2$, substituted $NH_2$, $CONH_2$, substituted $CONH_2$, $SO_2NH_2$, substituted $SO_2NH_2$, $SO_3H$, halogen, $NO_2$, CN, —$SO_2$-alkyl, —$SO_2$-aryl, —O-alkyl, —O-aryl, or —O-acyl.

Aryl substituents in the hydrocarbon intercalate compounds mentioned are preferably phenyl or naphthyl, which may each be substituted, for example, by halogen (such as F, Cl, or Br), —OH, $C_1$-$C_6$-alkyl, $C_1$-$C_6$-alkoxy, —$NH_2$, —$NO_2$, and —CN.

Alkyl substituents in the hydrocarbon intercalate compounds mentioned are preferably $C_1$-$C_6$-alkyl, which may be substituted, for example, by halogen (such as chlorine, bromine, or fluorine), —OH, —CN, —$NH_2$, or $C_1$-$C_6$-alkoxy.

Cycloalkyl substituents in the hydrocarbon intercalate compounds mentioned are preferably $C_3$-$C_7$-cycloalkyl (especially $C_5$-$C_6$-cycloalkyl), which may be substituted, for example by, $C_1$-$C_6$-alkyl, $C_1$-$C_6$-alkoxy, halogen (such as Cl, Br, or F), $C_1$-$C_6$-alkoxy, —OH, —CN, and $NH_2$.

Aralkyl substituents in the hydrocarbon intercalate compounds mentioned are preferably phenyl- or naphthyl-$C_1$-$C_4$-alkyl, which may be substituted in the aromatic radicals, for example, by halogen (such as F, Cl, or Br), —OH, $C_1$-$C_6$-alkyl, $C_1$-$C_6$-alkoxy, —$NH_2$, —$NO_2$, and —CN.

Acyl substituents in the hydrocarbon intercalate compounds mentioned are preferably ($C_1$-$C_6$-alkyl)-carbonyl, phenylcarbonyl, $C_1$-$C_6$-alkylsulfonyl, phenylsulfonyl, optionally $C_1$-$C_6$-alkyl-, phenyl-, and naphthyl-substituted carbamoyl, optionally $C_1$-$C_6$-alkyl-, phenyl-, and naphthyl-substituted sucfamoyl, or optionally $C_1$-$C_6$-alkyl-, phenyl-, or naphthyl-substituted guanyl, where the alkyl radicals mentioned may be substituted, for example, by halogen (such as Cl, Br, or F), —OH, —CN, —$NH_2$, or $C_1$-$C_6$-alkoxy and the phenyl and naphthyl radicals mentioned may be substituted, for example, by halogen (such as F, Cl, or Br), —OH, $C_1$-$C_6$-alkyl, $C_1$-$C_6$-alkoxy, —$NH_2$, —$NO_2$, and —CN.

Specific examples of preferred intercalates are paraffins and paraffin oils; triisobutylene, tetraisobutylene, mixtures of aliphatic and aromatic hydrocarbons such as produced in petroleum fractionation, for example; chlorinated paraffin hydrocarbons such as dodecyl chloride or stearyl chloride; $C_{10}$-$C_{30}$-alcohols such as 1-decanol, 1-dodecanol, 1-hexadecanol, 1-octadecanol, and their mixtures, olein alcohol, or 1,12-octadecanediol; fatty acids and their salts and mixtures, for example, formic acid, acetic acid, dodecanoic acid, hexadecanoic acid, octadecanoic acid, oleic acid; fatty acid esters, for example, the methyl esters of $C_{10}$-$C_{20}$-fatty acids; fatty acid amides such as stearamide, stearic acid monoethanolamide, and stearic acid diethanolamide, stearonitrile; fatty amines, for example, dodecylamine, cetylamine, hexadecylamine, octadecylamine, and others; salts of fatty amines with sulfonic and carboxylic acids; isocyclic hydrocarbons such as cyclododecane, decahydronaphthalene, o-, m-, p-xylene, mesitylene, dodecylbenzene mixture, tetralin, naphthalene, 1-methylnaphthalene, 2-methyinaphthalene, biphenyl, diphenylmethane, acenaphthene, fluorene, anthracene, phenanthrene, m-, p-terphenyl, o-, p-dichlorobenzene, nitrobenzene, 1-chloronaphthalene, 2-chloronaphthalene, and 1-nitronaphthalene; isocyclic alcohols and phenols and their derivatives such as benzyl alcohol, decahydro-2-naphthol, diphenyl ether; sulfones, for example, diphenyl sulfone, methyl phenyl sulfone, 4,4'-bis-2-(hydroxyethoxy)-diphenyl sulfone; isocyclic carboxylic acids and their derivatives such as benzoic acid, 3-nitrobenzoic acid, cinnamic acid, 1-naphthalenecarboxylic acid, phthalic acid, dibutyl phthalate, dioctyl phthalate, tetrachlorophthalic acid, 2-nitrobenzamide, 3-nitrobenzamide, 4-nitrobenzamide, 4-chloro-benzamide; sulfonic acids, such as 2,5-dichlorobenzenesulfonic acid, 3-nitro- and 4-nitrobenzenesulfonic acid, 2,4-dimethylbenzenesulfonic acid, 1- and 2-naphthalenesulfonic acid, 5-nitro-1- and 5-nitro-2-naphthalene-sulfonic acid, di-sec-butylnaphthalenesulfonic acid mixture, biphenyl-4-sulfonic acid, 1,4-, 1,5-, 2,6-, 2,7-naphthalene-disulfonic acid, 3-nitro-1,5-naphthalenedisulfonic acid, 1-anthraquinonesulfonic acid, 2-anthraqui-nonesulfonic acid, biphenyl-4,4'-disulfonic acid, 1,3,6-naphthalene-trisulfonic acid and the salts of these sulfonic acids (e.g., the sodium, potassium, calcium, zinc, nickel, and copper salts); sulfonamides such as benzenesulfonamide, 2-, 3- and 4-nitro-benzenesulfonamide, 2-, 3- and 4-chlorobenzenesulfonamide, 4-methoxybenzenesulfonamide, 3,3'-sulfonylbisbenzenesulfonamide, 4,4'-oxybisbenzenesulfonamide, and 1-and 2-naphthalenesulfonamide.

Carboxamides and sulfonamides are a preferred group of compounds to be intercalated (i.e., the intercalates). Also particularly suitable are urea and substituted ureas such as phenylurea, dodecylurea, and others and also their polycondensates with aldehydes, especially formaldehyde; heterocycles such as barbituric acid, benzimidazolone, 5-benzimidazolonesulfonic acid, 2,3-dihydroxyquinoxaline, 2,3-dihydroxy-quinoxaline-6-sulfonic acid, carbazole, carbazole-3,6-disulfonic acid, 2-hydroxyquinoline, 2,4-dihydroxyquinoline, caprolactam, melamine, 6-phenyl-1,3,5-triazine-2,4-diamine, 6-methyl-1,3,5-triazine-2,4-diamine, and cyanuric acid.

Particularly preferred intercalates further include surface-active compounds, especially surfactants, that are known, for example, from K. Lindner, *Tenside-Textilhilfsmittel-Waschrohstoffe*, $2^{nd}$ edition, Volume I, Wissenschaftliche Verlagsgesellschaft mbH, Stuttgart, 1964. Suitable surface-active compounds can be anionic, non-ionic, or cationic compounds or ampholytes. Examples of suitable anionic compounds are true soaps, salts of aminocarboxylic acids, salts of lower or higher acylated aminocarboxylic acids, fatty acid sulfates, sulfates of fatty acid esters, amides, and the like, primary alkyl sulfates, sulfates of oxo alcohols, secondary alkyl sulfates, sulfates of esterified or etherified polyoxy compounds, sulfates of substituted polyglycol ethers (sulfated ethylene oxide adducts), sulfates of acylated or alkylated alkanolamines, sulfonates of fatty acids, their esters, amides, and the like, primary alkyl sulfonates, secohdary alkyl sulfonates, alkyl sulfonates with acyls attached in ester fashion, alkyl or alkylphenyl ether sulfonates, sulfonates of polycarboxylic esters, alkylbenzenesulfonates, alkylnaphthalenesulfonates, fatty aromatic sulfonates, alkylbenzimidazolesulfonates, phosphates, polyphosphates, phosphonates, phosphinates, thiosulfates, hydrosulfites, sulfinates, and persulfates. Examples of suitable non-ionic compounds are esters and ethers of polyalcohols, alkyl polyglycol ethers, acyl polyglycol ethers, alkylaryl polyglycol ethers, and acylated and alkylated alkanolamine polyglycol ethers. Examples of suitable cationic compounds are alkylamine salts, quaternary ammonium salts, alkylpyridinium salts, simple and quaternary imidazoline salts, alkyldiamines and alkylpolyamines, acyl-diamines and acylpolyamines, acylalkanolamines, alkanolamine esters, alkyl-$OCH_2$—N-pyridinium salts, alkyl-CO—NH—$CH_2$—N-pyridinium salts, alkylethyleneureas, sulfonium compounds, phosphonium compounds, arsenium compounds, alkylguanidines, and acylbiguanidides. Examples of suitable ampholytes are alkylbetaines, sulfobetaines, and aminocarboxylic acids. Preference is given to using non-ionic surfactants, especially the ethylene oxide addition products of fatty alcohols, fatty amines, and also of octyl- or nonylphenol.

A further important group of preferred intercalates are natural resins and resin acids such as, for example, abietic acid and its conversion products and salts. Examples of such conversion products are hydrogenated, dehydrogenated, and disproportionated abietic acids. These can further be dimerized, polymerized, or modified by addition of maleic anhydride and fumaric acid. Also of interest are the resin acids modified at the carboxyl group such as, for example, the methyl, hydroxyethyl, glycol, glyceryl, and pentaerythritol esters, resin acid nitriles and resin acid amines, and also dehydroabietyl alcohol.

Also suitable for intercalation are polymers, for example, ethylene-propylene oxide block polymers, preferably having a number average molecular weight $M_n$ not less than 1000 (especially of 1000 to 10,000 g/mol), polyvinyl alcohol, poly(meth)acrylic acids, modified cellulose, such as carboxymethylcelluloses, hydroxyethyl- and hydroxypropylcelluloses, and methyl- and ethylhydroxyethylcelluloses.

Other suitable intercalates are condensation products based on (A) sulfonated aromatics, (B) aldehydes and/or ketones, and (C) optionally, one or more compounds selected from the group of the non-sulfonated aromatics, urea, and urea derivatives.

Based on means that the condensation product was optionally prepared from other reactants besides (A), (B), and optionally (C). Preferably, however, the condensation products for the purposes of this application are prepared only from (A), (B), and optionally (C).

The sulfonated aromatics of component (A) will be understood in the context of this invention as including sulfomethylated aromatics as well. Preferred sulfonated aromatics are naphthalenesulfonic acids, phenolsulfonic acids, dihydroxybenzenesulfonic acids, sulfonated ditolyl ethers, sulfomethylated 4,4'-dihydroxydiphenyl sulfone, sulfonated diphenylmethane, sulfonated biphenyl, sulfonated hydroxybiphenyl (especially 2-hydroxybiphenyl), sulfonated terphenyl, or benzenesulfonic acids.

Aldehydes and/or ketones useful as component (B) include in particular aliphatic, cycloaliphatic and also aromatic ones. Preference is given to aliphatic aldehydes, particularly preferably formaldehyde and other aliphatic aldehydes of 3 to 5 carbon atoms.

Examples of non-sulfonated aromatics useful as component (C) are phenol, cresol, 4,4'-dihydroxydiphenyl sulfone, and dihydroxydiphenyl-methane. Examples of urea derivatives are dimethylolurea, alkylureas, melamine, and guanidine.

Preference is given to a condensation product based on (A) at least one sulfonated aromatic selected from the group consisting of naphthalenesulfonic acids, phenolsulfonic acids, dihydroxy-benzenesulfonic acids, sulfonated ditolyl ethers, sulfomethylated 4,4'-dihydroxydiphenyl sulfone, sulfonated diphenylmethane, sulfonated biphenyl, sulfonated hydroxybiphenyl, especially 2-hydroxybiphenyl, sulfonated terphenyl, and benzenesulfonic acids, (B) formaldehyde, and (C) optionally, one or more compounds selected from the group consisting of phenol, cresol, 4,4'-dihydroxydiphenyl sulfone, dihydroxydiphenylmethane, urea, dimethylolurea, melamine, and guanidine.

Preferred condensation products are condensation products based on 4,4'-dihydroxydiphenyl sulfone, sulfonated ditolyl ether, and formaldehyde; 4,4'-dihydroxydiphenyl sulfone, phenolsulfonic acid, and formaldehyde; 4,4'-dihydroxydiphenyl sulfone, sodium bisulfite, formaldehyde, and urea; naphthalenesulfonic acid, 4,4'-dihydroxydiphenyl sulfone, and formaldehyde; sulfonated terphenyl and formaldehyde; and/or sulfonated 2-hydroxybiphenyl, and formaldehyde; and also naphthalenesulfonic acid and formaldehyde.

Preferably the intercalated compound (i.e., the intercalate) is a cyclic or acyclic organic compound, especially melamine or a melamine derivative or a polycondensate, preferably based on urea and formaldehyde, or an ethylene oxide-propylene oxide block copolymer.

Particular preference for use as intercalates is given to melamine or melamine derivatives, especially those of the formula (III)

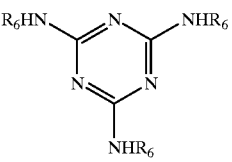

wherein $R_6$ is hydrogen, $C_1$-$C_4$-alkyl, which is optionally substituted by OH groups, or phenyl, very particularly preferably where $R_6$ is hydrogen.

An intercalate that is likewise preferred is phenyloliaminotriazine.

The amount of intercalate incorporable in the crystal lattice of the metal complex in the practice of the process according to the invention is generally 5% to 200% by weight, based on the amount of azobarbituric acid metal complex. Preference is given to an intercalate amount of 10 to 100% by weight. The amount referred to here is the amount of substance that is not washed out by suitable solvents and that is obtained from the elemental analysis. It will be appreciated that it is also possible to add more or less than the aforementioned amount of intercalate, in which case one may optionally not need to wash out an excess. Preference is given to amounts of 10 to 150% by weight of intercalate in the process.

A likewise preferred embodiment of the process according to the invention is characterized in that 1:1 azo metal complexes conforming to the formula (Ia)

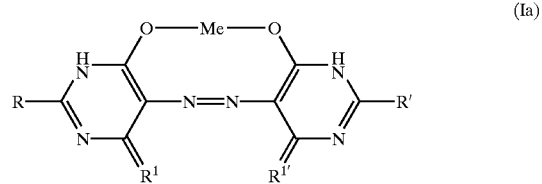

or one of its tautomeric forms,
wherein
Me denotes the metals as defined for formula (I),
R and R' and $R^1$ and $R^{1'}$ are each as defined for formula (I),
are prepared using equimolar amounts of the sodium, lithium, or
potassium salt of the azo compound and the metal salt of the polyvalent metal.

The preferred inventive metal complexes of the azo compounds that contain an intercalate have a color locus defined by the following ranges for the chromaticity coordinates x and y:

$$x = \frac{X}{X+Y+Z} \qquad y = \frac{Y}{X+Y+Z}$$

where X, Y, and Z are tristimulus values.

The color loci are determined on alkyd-melamine varnishes according to DIN 53 238 in which the pigments are present in a completely dispersed state. The standardized color system is described in *Bayer Farben Revue,* Sonderheft 3/2 D, 1986; p. 12–14.

The metal salt for the laking reactions between azobarbituric acid (derivative) and metal salt is preferably selected from water-soluble metal salts of the abovementioned metals, especially chlorides, bromides, acetates, or nitrates of the metals. Preferred metal salts have a water solubility of more than 20 g/l (especially more than 50 g/l) at 20° C.

Particularly suitable metal salts for the process of preparation are magnesium chloride, magnesium sulfate, calcium chloride, calcium acetate, calcium formate, barium chloride, barium nitrate, barium acetate, barium carbonate, strontium nitrate, manganese chloride, manganese sulfate, iron(III) chloride, iron(II) nitrate, iron(II) sulfate, cobalt chloride, cobalt nitrate, cobalt sulfate, nickel formate, nickel nitrate, nickel sulfate, nickel chloride, nickel acetate, aluminum sulfate, aluminum nitrate, chromium(III) sulfate, chromium (II) nitrate, zinc chloride, zinc sulfate, zinc acetate, cadmium chloride, cadmium sulfate, cadmium nitrate, copper(II) sulfate, copper(II) chloride, copper(II) acetate, copper(II) formate, lanthanum nitrate, and aluminum chloride hydrate.

It is also possible to use these salts in mixtures, which contain various ones of the metals mentioned. The use of such salt mixtures is especially advisable to obtain intermediate hues for the colored end products.

The metal complexes obtained according to the invention can then be isolated in the form of aqueous press cakes by filtration of their aqueous suspensions. These press cakes can be dried according to customary drying processes, for example, after washing with hot water.

The invention therefore provides for inventive metal complex intercalates having a dispersion harshness of less than 200 (measured on the lines of DIN 53 775 Part 7), the cold rolling temperature being 25° C. and the hot rolling temperature being 150° C.

All the dispersion harshnesses reported herein were determined by this modified method.

The metal complexes of an azo compound of the formula (I) which intercalate at least one compound are herein referred to as pigments. The invention therefore also provides for pigment preparations comprising at least a pigment according to the invention and a dispersant.

Dispersants for the purposes of this application are substances that stabilize the pigment particles in their fine particulate form in aqueous media. Finely particulate is preferably understood as meaning having a fine division of 0.001 to 5 μm, especially of 0.005 to 1 μm, particularly preferably of 0.005 to 0.5 μm.

The metal complexes obtainable by the process of the invention are very useful for all pigment applications. They are useful, for example, for pigmenting varnishes of all kinds for the production of printing colors, distemper colors or binder colors, for the mass coloration of synthetic, semisynthetic, or natural macromolecular substances such as, for example, polyvinyl chloride, polystyrene, polyamide, polyethylene, or polypropylene. They are also useful for the spin-dyeing of natural, regenerated or artificial fibers, such as, for example, cellulose, polyester, polycarbonate, polyacrylonirile, or polyamide fibers, and also for printing textiles and paper. These pigments provide finely divided, stable, aqueous pigmentations of emulsion and paint colors which are useful for paper coloration, for the pigment printing of textiles, for laminating, and also for the spin-dyeing of viscose, by grinding or kneading in the presence of non-ionic, anionic, or cationic surfactants.

The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

General Process Description

The invention can be more particularly described by way of example with reference to the processing scheme of FIG. 1.

A dispersion of the alkali metal salt of the azobarbituric acid derivative and of the metal salt is stirred at a temperature of about 20° C. in a stock reservoir vessel 1 and comminuted in cavitron 8, which forms part of a pumped circulation circuit.

Stock reservoir vessel 2 is charged with the aqueous preparation of the intercalate. The solutions from stock reservoir vessels 1 and 2 are mixed together, the mixing ratios of the reactant streams being settable by means of the control of feed pumps 9 and 10.

Cocks 47 and 43 are opened and cocks 37 and 34 are closed. The streams of metal complex A and intercalate dispersion B are mixed in mixing nozzle 22 and then passed through a reactor 18. The pH of the reaction mixture is measured using pH probe 16 and, if necessary, adjusted to the desired value in mixing nozzle 22 by adding alkali or acetate buffer solution from vessel 3. Cock 26 is closed. After passing through the apertured-disc battery 20 (throttle nozzle), the mixture flows into the receiver 6, where the mixture is adjusted to pH 5 (pH meter 19) by metered addition of bases from stock reservoir 5.

Cocks 39, 40, 41, and 42 are drain cocks of stock reservoir vessels 1 to 4.

Valves 29, 30, 33, and 36 are overpressure valves, which are installed as safety valves. In the event of a product build-up and an associated pressure build-up, the reactant flows back into the stock reservoir vessel.

Cock 46 controls the rinse water for cleaning the reactors.

In the case of fast-reacting starting compounds, it is alternatively possible for all the components needed (metal salt, azobarbituric acid compounds, and intercalate) to be initially charged to and stirred/comminuted in stock reservoir vessel 1.

In the case of slower-reacting starting compounds where, in addition, laking and intercalation are to take place in different pH ranges, the procedure adopted is generally as described below. Azobarbituric acid (or derivative) and the dissolved metal salts are the constituents of the suspension in stock reservoir vessel 1. The intercalate is situated in stock reservoir vessel 2. Cocks 37, 34, 31, 43, and 28 are closed. Cocks 47, 44, 48, and 49 are opened. The reaction mixture and the pH-influencing chemical from vessel 3 are mixed in mixing nozzle 22 and pass through the reactor 18. The actual pH after the laking reaction is measured using a pH probe 16 and, if necessary, adjusted into the desired target range by changing the feed rate of the control chemicals from vessel 3 by means of pump 11. The substance to be intercalated is pumped into the stream of the dispersion of the laked azobarbituric acid derivative below reactor 18 and the resultant mixture passes through the static mixer 25. The apertured-disc battery maintains the pressure in reaction zones 17 and 18 at about 3 bar. The pH probe 15 is used to measure the pH of the fully reacted dispersion. The control system 24 of pump 12 regulates the throughput of control chemical from a further stock reservoir vessel 4 to achieve the pH target range for an optimum intercalation reaction.

Example 1

1100 g of an 11% by weight sodium azobarbituric acid dispersion, 100 g of melamine, 80.5 g of $CDCl_2$ ∀ $H_2O$ in 1000 g of deionized water were initially charged to stock reservoir vessel 1 and circulated through cavitron 8 for 15 minutes. Cocks 37, 43, and 49 were or had been closed. With cock 47 in the open position, the dispersion was conveyed through reactor 18, which was temperature controlled to 103° C. The flow rate was 6 kg/h. The pH below the first reactor 18 was measured using the pH probe 16 and maintained at pH 2 by pumped addition of sodium acetate solution from vessel 3. In receiver 6, the pH of the mixture was measured using probe 19 and raised to pH 5 with sodium acetate solution from vessel 5 to terminate the reaction. Thereafter, the product was isolated on a suction filter, washed electrolyte-free with hot water, dried, and ground in a laboratory mill. The pigment powder thus obtained was incorporated according to DIN 53238 in an alkyd-melamine varnish.

The CIELAB tristimulus values of the pigment were:

$$X=10.66\ Y=10.37\ Z=7.35.$$

The BET specific surface area of the pigment was 20.2 m$^2$/g.

Example 2

Example 1 was repeated except that the CDCl$_2$ ∀ H$_2$O was replaced by 90.3 g of SnCl$_2$ ∀ 2 H$_2$O. The pH below the first reactor 18 was maintained at pH 2.0. The pigment powder obtained was incorporated according to DIN 53238 in an alkyd-melamine varnish.

The CIELAB tristimulus values of the color locus of the pigment were:

$$X=19.9\ Y=15.3\ Z=6.2.$$

The BET specific surface area of the product was 39 m$^2$/g.

Example 3

5000 g of an 11% by weight sodium azobarbituric acid dispersion, 480 g of melamine, 2250 g of 25% by weight NiCl$_2$ ∀ 6H$_2$O solution, and 2500 g of deionized water were initially charged to vessel 1 and comminuted for 20 minutes by circulation through the cavitron (8). The reactor temperature was 114° C. The mixture was pumped through reactors 17 and 18 as in Example 1. The flow rate of the reaction mixture was 8 kg/h and the pH of the mixture was adjusted to pH 1.4 by metered addition of sodium acetate solution. The pigment powder isolated similarly to Example 1 was incorporated according to DIN 53238 in an alkyd-melamine varnish.

The CIELAB tristimulus values of the color locus of the pigment were:

$$X=27.22\ Y=22.46\ Z=5.6.$$

The BET specific surface area of the powder was 67 m$^2$/g. The dispersion harshness of the powder was 80.

Example 4

1000 g of a 12% by weight sodium azobarbituric acid dispersion, 450 g of a 24% by weight NiCl$_2$ ∀ 6H$_2$O solution, and 500 ml of water were initially charged to vessel 1.500 ml of 20% by weight of Pluronic F38 (an EO-PO polycondensate from BASF AG, molar mass 5000) solution were charged to vessel 2. Cock 43 had been closed and cock 44 opened, so that the polymer was mixed in below the first reactor 18. The target pH was 0.8 and was controlled by addition of sodium acetate solution from vessel 3. The flow rate was 6 kg/h. The reactor temperature was 114° C. The pigment powder isolated similarly to Example 1 was incorporated according to DIN 53238 in an alkyd-melamine varnish.

The CIELAB color locus of the pigment was:

$$X=28.4\ Y=24.5\ Z=5.5.$$

The BET specific surface area of the powder was 30 m$^2$/g.

Example 5

64.1g of the potassium salt of cyaniminoazobarbituric acid and 338.7 g of MnCl$_2$ ∀ H$_2$O were stirred in 7 l of deionized water in vessel 1 and comminuted for 15 minutes by cavitron 8. 419.3 g of melamine were dispersed with 2 l of deionized water in vessel 2.

Cocks 47, 44, 48, and 49 had been opened. Laking took place in reactor 18 at pH 5. The pH after the laking reaction was measured using pH probe 16 and, if necessary, sodium acetate solution from vessel 3 was added in mixing nozzle 22 to achieve the laking target pH of 5. The melamine dispersion from vessel 2 was metered in above static mixer 25 and the intercalation target pH of 2.5 was obtained by addition of 10% HCl solution from vessel 4. The pH of the intercalation reaction was measured by pH meter 15. The pigment powder obtained was incorporated according to DIN 53238 in an alkyd-melamine varnish.

The CIELAB color locus of the pigment was:

$$X=40\ Y=28.15\ Z=5.6.$$

The BET surface area of the pigment was 32 m$^2$/g.

What is claimed is:

1. A continuous process for preparing metal complexes of polyvalent metal ions with mono-, di-, tri-, or tetraanions of an azo compound conforming to the formula (I)

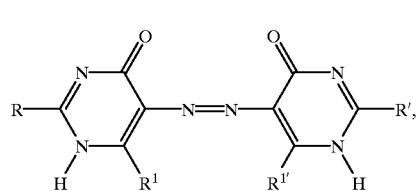

or one of its tautomeric structures,
wherein
R and R' are independently —OH, —NH$_2$, —NH—CN, arylamino, acylamino, or p-chlorophenyl, and
R$^1$ and R$^{1'}$ are independently —OH or —NH$_2$,
that intercalate at least one intercalate that is a compound different from the compounds of formula (I),
wherein the metals of the polyvalent metal ions are selected from the group consisting of Ca, Zn, Cu, Fe, Mn, Ni, Co, Sr, Ba, Cr, Sn, Al, Mg, Cd, Pb, and La,
comprising
  (1) stirring an aqueous dispersion of an alkali metal salt of a compound of formula (I) with the metal salt of the polyvalent metal at a temperature of 10 to 35° C., if appropriate at a pH of 0.5 to 5.5,
  (2) admixing an aqueous solution, dispersion, or emulsion of the intercalate, if appropriate with comminution of solid particles of the mixture before and/or after the admixing of the intercalate,
  (3) passing the mixture through a reaction zone at a temperature of 85 to 140° C., while regulating the pH of the mixture entering the reaction zone so that the product dispersion leaving the reaction zone has a pH of 0.5 to 3, (4) subsequently adjusting the pH of the mixture to at least pH 5, and (5) isolating the intercalated metal complex.

2. A process according to claim 1 wherein the solid particles of the mixture are comminuted in a pumped circulation circuit.

3. A process according to claim 1 wherein the solid particles of the mixture are comminuted in a pumped circulation circuit by passing the mixture through a cavitron.

4. A process according to claim 1 wherein the intercalate is a cyclic or acyclic organic compound.

5. A process according to claim 1 wherein the intercalate is melamine or a melamine derivative, a polycondensate based on urea and formaldehyde, or an ethylene oxide-propylene oxide block copolymer.

6. A process according to claim 1 wherein the residence time of the mixture in the reaction zone is 2 to 10 min.

7. A process according to claim 1 wherein a 1:1 azo metal complex conforming to the formula (Ia)

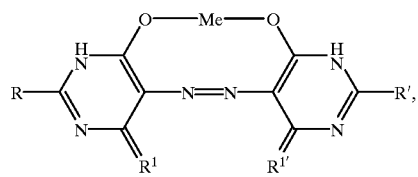

(Ia)

or one of its tautomeric forms,
wherein

Me corresponds to a metal selected from the group consisting of Ca, Zn, Cu, Fe, Mn, Ni, Co, Sr, Ba, Cr, Sn, Al, Mg, Cd, Pb, and La, R and R' are independently —OH, —$NH_2$, —NH—CN, arylamino, acylamino, or p-chlorophenyl, $R^1$ and $R^{1'}$ are independently =O or =NH, is prepared using equimolar amounts of the sodium, lithium, or potassium salt of the azo compound and the metal salt of the polyvalent metal.

8. A process according to claim 1 wherein the pH in the reaction zone is set by adding a strong or weak base.

9. A pigment preparation comprising as pigment at least one metal complex obtained from the process of claim 1 and at least one dispersant.

10. A method comprising introducing a metal complex obtained according to claim 1 into a pigmenting varnish used as a printing color, distemper color, or binder color.

11. A method for mass coloration comprising introducing a metal complex obtained according to claim 1 into a synthetic, semisynthetic, or natural macromolecular material.

12. A method for spin dyeing comprising applying a metal complex obtained according to claim 1 onto natural, regenerated, or artificial fibers by a spin dyeing process.

13. A method for printing textiles and paper comprising applying a metal complex obtained according to claim 1 onto a textile or paper by a printing process.

* * * * *